3,778,380
METHOD FOR PRODUCING UO₂ LOADED REFRACTORY METALS

Richard D. Baker, Sidney W. Hayter, and Homer D. Lewis, Los Alamos, N. Mex., assignors to the United States of America as represented by the United States Atomic Energy Commission
No Drawing. Filed Oct. 31, 1966, Ser. No. 591,017
Int. Cl. C09k 3/00
U.S. Cl. 252—301.1 R         9 Claims

ABSTRACT OF THE DISCLOSURE

A finely divided dispersion of $UO_2$ in tungsten or molybdenum is prepared by co-precipitating the metals from mixed aqueous solution with oxine. The co-precipitate thus formed is separated from the solution, dried, calcined, and finally reduced to $UO_2$ and refractory metal.

---

The invention described herein was made in the course of, or under, a contract with the U.S. Atomic Energy Commission.

This application relates to a method for producing dispersions of $UO_2$ in refractory metals and, more particularly, a method for producing dispersions of $UO_2$ in at least one of molybdenum and tungsten.

In dispersion-type fuel elements for power reactor applications, it is necessary that the fissionable material particle size be sufficiently greater than the average fission fragment range to limit radiation damage to the matrix materials. However, when considering dispersion reactors for nuclear rocket propulsion applications, entirely different problems are posed. For example, the operation of such reactors at temperatures in excess of 2000° C. imposes severe requirements on the fuel element materials with respect to strength and ability to retain $UO_2$. However, since the operating times of such reactors are to be only a few hundered seconds, radiation damage to fuel element matrix materials is not a problem. Accordingly, in metal-$UO_2$ fuel element materials for nuclear rocket propulsion reactors, use can be made of extremely small $UO_2$ particles. $UO_2$ particle size can be chosen to give optimum grain size and $UO_2$ retention for reactor operating conditions.

Refractory metal powders may be mechanically blended with $UO_2$ powder and the mixtures then fabricated into thin sheets by a variety of powder metallurgy techniques. However, strip produced in this manner is subject to considerable $UO_2$ loss when operated at high temperatures.

It is an object of this invention to provide a method of making finely divided dispersions of $UO_2$ in refractory metals.

It is a further object of this invention to utilize chemical methods to prepare dispersions of $UO_2$ in a matrix of at least one refractory metal selected from the group consisting of molybdenum and tungsten.

It is another object of this invention to prepare very finely divided $UO_2$ in a refractory metal matrix so that the loss of $UO_2$ at high temperatures is considerably reduced.

The above and other objects and advantages of the invention are achieved by the coprecipitation of uranium salt with a salt of molybdenum and/or a salt of tungsten by addition of oxine, subsequent oxidation of the mixed salts to form mixed oxides and subsequent reduction to form refractory metal (or metals)-$UO_2$ powder. This powder may then be powder-rolled, sintered, and hot-rolled in the standard manner to produce "dispersion strip."

More particularly, uranyl nitrate hexahydrate (UNH), $UO_2(NO_3)_2 \cdot 6H_2O$ is kept in solution with either or both of ammonium heptamolybdate (AHM),

and ammonium metatungstate, (AMT),

Oxime (8-hydroxyquinoline), $C_9H_7ON$, precipitant solution was made by adding 0.5 to 0.6 ml. of glacial acetic acid per gram of oxime and heating to 70–80° C. until all the oxime was in solution. It was used at this temperature and always in 10% excess. This precipitant solution shall hereinafter be called the standard precipitant. The conditions under which it normally precipitates the individual elements are as follows:

| Element | Compound | Name | pH range for complete precipitation |
|---|---|---|---|
| Mo | MoO₂(C₉H₆ON)₂ | Molybdenyl oxinate | 3.6–7.3 |
| W | WO₂(C₉H₆ON)₂ | Tungstyl oxinate | 5.0–5.7 |
| U | UO₂(C₉H₆ON)₂·(C₉H₇ON) | Uranyl oxinate | 4.1–9.8 |

If the desired combination of elements is kept in solution, the addition of oxine acts as a common precipitant to bring down oxinates of the elements as very intimate mixtures. After the elements are precipitated as oxinates they are dried in a 100° C. drying oven and calcined to form mixed oxides. When Mo is in stoichiometric excess to U, increasing calcination temperatures above 600° C. causes an undesirable increase of $MoO_3$ sublimation. Therefore, precipitates containing molybdenyl oxinates are calcined at dull red heat (580° C.). Those oxinates containing combinations of W and U are calcined at 800° C. A bed of these mixed oxides ½ to 1 in. deep is then formed in a Mo boat. This is placed in a Mo-wound resistance furnace and heated in $H_2$ at 700 to 760° C. for up to 3 hours. Gentle rabbling of the bed seems to produce a more desirable product and aids in completing the reduction. As a final step, the temperature is rapidly raised to as high as 1500° C. for up to one hour to promote particle growth. The system is then rapidly cooled. This procedure results in a reduction product that is not pyrophoric.

The process of the present invention is illustrated by the following specific examples.

Mo·UO₂

(A) Mo·UO₂(20 v/o)

This example illustrates the procedure used to prepare material for calcination and reduction to Mo-20 v/o $UO_2$. The precipitation is on the largest scale that can be conveniently done in a 5-liter flask, and yields oxinates for preparation of about 250 g. of final Mo—$UO_2$.

(1) Dissolve 372.0 g. of ammonium heptamolybdate in a 5-liter flask with 1900 ml. of $H_2O$.
(2) Add 61 ml. (0.92 equiv. wt.) of concentrated $NH_4OH$. If too much or too little $NH_4OH$ is added, uranyl polymolybdates begin to precipitate shortly after the uranyl nitrate has been added. The solution is then heated to about 75° C.

(3) Add 100 g. of UNH dissolved with 500 ml. of hot (60–80° C.) water.

(4) Add 250 ml. of hot (70–80°) oxine solution out of 1050 ml. of solution prepared by heating 400 ml. of glacial acetic acid with 770 g. of oxine.

(5) Add the remaining 800 ml. of oxine concurrently with 350 ml. (5.26 equiv. wt.) of concentrated ammonium hydroxide so that both are added in approximately the same time. The rate of addition of precipitating reagents is not critical.

(6) Filter the suspension immediately and allow the precipitate cake to aspirate for several hours.

(7) Dry the material at 100–120° C. Transfer to an oven and slowly bring the temperature up to 500° C. over a period of 16 hours. Maintain this temperature for 8 hours. Raise the temperature to 550–580° C. and maintain for 48 hours. Put the material in a blender or tumble it for a few hours and it is ready for use.

This material is an intimate mixture of molybdenum and uranium oxides with a fine grain structure. The X-ray analysis of a sample gives a complex diffraction pattern containing none of the known uranium oxides or molybdenum oxides, hence it is believed to be composed of double oxides. The material assays 13% uranium and 56% molybdenum; however, with slight modifications of the precipitate procedure any desired composition could be made so long as the mole ratio of molybdenum to uranium is greater than 1.5:1. Other mixed oxinates are made with Mo:U mole ratios of approximately 8:1 and 100:1. These are calcined and reduced to Mo-25 v/o $UO_2$ and Mo-2.5 v/o $UO_2$, respectively. When the mole ratio of Mo:U is less than 1.5:1 it is necessary to add a strong complexing agent for Mo to prevent the formation of uranyl polymolybdates. In the following specific procedure, the complexing agent, citric acid, is added in an approximate 50% excess with respect to Mo. This procedure is used to prepare mixed oxinates containing Mo:U in the weight ratio of 10:90 (mole ratio of 0.275:1). The scale is 300 g. of metals per batch. A similar procedure can easily be developed for any other composition of Mo and U oxinates where the mole ratio of Mo:U is less than 1.5:1.

(B) Mo:U mole ratio less than 1.5:1

(1) Dissolve 569.7 g. of UNH by heating with 2500 ml. of $H_2O$ in a 5-liter flask.

(2) Add 96.0 g. of citric acid and 55.2 g. of ammonium heptamolybdate dissolved with 600 ml. of hot $H_2O$.

(3) While stirring vigorously, stream in a hot solution of oxine prepared by heating 390 ml. of glacial acetic acid with 651 g. of oxine.

(4) Add 600 ml. (9.02 equiv. wt.) of concentrated $NH_4OH$.

(5) Filter the suspension immediately. (The filtrate should contain less than 0.1 g. of solids unvolatilized at 580° C. in air.)

Molybdenyl-uranyl oxinates are thoroughly dried and slightly decomposed by heating at 150° C. for 24 hours. The material is transferred to a muffle furnace and carefully charred by increasing the temperature to 580° C. over a period of 16 hours. A temperature of 580° C. is then maintained for 24 to 48 hours, depending on the thickness of the layer of material. The material is considered to be satisfactorily calcined if it assays less than 100 p.p.m. of carbon. In the case of those compositions not containing molybdenum, a temperature of 800° C. is used.

Calcination at 580° C. causes some segregation of Mo by formation of rod-shaped crystals of $MoO_3$. In some oxides, as much as 3 to 4% of the Mo is in this form. However, this does not seem to interfere with the usefulness of the material. Microscopic examination shows $MoO_3$ crystals plus an unidentified phase believed to be a double oxide of Mo and U. X-ray analysis confirms the presence of this unidentified phase. The formation of large $MoO_3$ crystals could be prevented by calcining for a longer time at 450° C., with a forced draft of air through the muffle furnace.

In the special case where the mole ratio of Mo:U is only 0.275:1, the oxinate precipitate is calcined at 625° C. with no evidence of $MoO_3$ volatilization or formation of rod-shaped $MoO_3$ crystals. Presumably this is because all of the Mo is present only in a double oxide. X-ray analysis shows this calcination product to be mainly $U_3O_8$ plus a minor unidentified constituent.

The oxides obtained by calcining thoroughly dried molybdenyl-uranyl oxinate precipitates are easily crumbled to a very fine powder by tumbling for a short time. The material can then usually be brushed through a 325-mesh sieve with no preliminary grinding.

Examples C to H illustrate other runs yielding mixed oxides of Mo and U.

(C) Mo·$UO_2$(20 v/o) developmental run (1) Heat 3000 ml. of 0.025 molar solution of ammonium heptamolybdate to 80° C.

(2) Add 40 ml. (0.60 equiv. wt.) of concentrated $NH_4OH$ to pH-5.8 at 80° C.

(3) Stir in 500 ml. of 0.1 molar uranyl nitrate solution.

(4) Begin to stir in the standard precipitant. Upon reaching pH-5.0, begin simultaneous addition of concentrated $NH_4OH$ and maintain pH-4.5 to pH-5.7 during precipitation ending at pH-5.7.

(D) Mo·$UO_2$(20 v/o) precipitation at near-maximum concentration (1) Heat 200 ml. of 0.188 molar ammonium heptamolybdate solution.

(2) After solution reaches 60° C., add 6 ml. (0.09 equiv. wt.) of concentrated $NH_4OH$.

(3) After solution reaches 80° C., stir in 50 ml. of 0.5 molar uranyl nitrate solution.

(4) Stir until nearly all the uranyl polymolybdates have gone back into solution.

(5) Add 3 ml. of concentrated $NH_4OH$ (0.05 equiv. wt.) to remove remaining cloudiness.

(6) Make standard precipitation, i.e., add 10% stoichiometric excess of standard oxinate solution while maintaining pH-5±0.5 by adding concentrated $NH_4OH$ to the end of the precipitation.

(E) Mo—$UO_2$(20 v/o) (working concentration)

For routine production, it is considered undesirable to work too closely to the maximum concentration. The preceding near-maximum concentration procedure is used as a guide. A concentration reduction of 20% is instituted and the following larger scale precipitation is carried out.

(1) 2000 ml. of 0.15 molar ammonium heptamolybdate is added to a 5-liter flask.

(2) To this pH-5.2 solution at room temperature is added 70 ml. concentrated $NH_4OH$ (1.05 equiv. wt.) to pH-6.3 at 27° C.

(3) Heating of the solution changes the pH to 5.3 at 75° C.

(4) 500 ml. of warm 0.4 molar uranyl nitrate solution is streamed into the flask with stirring. The pH-5.0 at 75° C. is observed.

(5) 250 ml. out of 1040 ml. of 70° C. standard oxine precipitant is added with pH dropping to 4.5.

(6) Shut off heat with solution temperature at 85° C.

(7) Add remaining precipitant concurrently with 250 ml. concentrated $NH_4OH$ (3.76 equiv. wt.) over a period of 15 minutes (pH-4.8 temperature 93° C.).

(8) Add 90 ml. concentrated $NH_4OH$ (1.35 equiv. wt.) to final pH-5.7.

(9) Separate precipitate immediately by filtration. Note on pH range: The optimum pH range for keeping concentrated solutions of uranyl nitrate and ammonium heptomolybdate from forming insoluble uranyl polymolybdates, seems to be quite narrow (a few tenths of a pH unit). However, the pH range may vary considerably more during precipitation, perhaps because of complexing effects exerted by acetate ions.

(F) Mo—UO$_2$ (90.5 v/o)

(1) Dissolve 569.7 g. uranylnitrate hexahydrate (UNH) by heating with 2500 ml. of distilled H$_2$O in a 5-liter flask to make an 0.539 molal solution at 70–80° C.
(2) Dissolve 96.0 g. citric acid and 55.2 g. of ammonium heptomolybdate (AHM) with 600 ml. of distilled H$_2$O to make a solution 0.074 molal with respect to AHM and 0.762 molal with respect to citric acid.
(3) Stir the Mo-citric acid solution into the uranyl nitrate solution.
(4) With the combined solutions at approximately 50° C., stir in the standard hot precipitant solution.
(5) Add 600 ml. concentrated NH$_4$OH (9.02 equiv. wt.) to pH-5.8 and filter off precipitate immediately.

(G) Mo—UO$_2$(5 v/o)

(1) Prepare oxine solution in advance. Heat 347 ml. concentrated glacial acetic acid with 667 g. oxine and maintain the solution at >70° C. until used.
(2) Add 2 liter of 0.159 molar AHM solution to a 5-liter flask.
(3) Add 61–63 ml. (0.92–0.95 equiv. wt.) concentrated NH$_4$OH. This must be observed to prevent the formation of uranyl polymolybdates.
(4) Heat the solution in the flask to 75–85° C.
(5) Add 500 ml. 0.081 molar uranyl nitrate to the flask.
(6) Add 250 ml. of hot standard precipitant solution to the flask with vigorous stirring.
(7) Stream in remaining oxine solution concurrently with 250 ml. (3.76 equiv. wt.) of concentrated NH$_4$OH.
(8) Filter immediately and calcine to oxides.

(H) Mo—UO$_2$(10 v/o)

(1) Heat 370 ml. concentrated glacial acetic acid with 712 ml. oxine and maintain at >70° C.
(2) Add 2 liters of 0.159 molar solution of ammonium heptamolybdate to a 5-liter flask.
(3) Add 61–63 (0.92–0.95 equiv. wt.) concentrated NH$_4$OH, which will prevent formation of uranyl polymolybdates. Heat solution to 75–85° C.
(4) Add 500 ml. 0.178 molar uranyl nitrate to flask.
(5) Add 250 ml. oxine solution to flask with vigorous stirirng.
(6) Stream in remaining oxine concurrently with 250–300 ml. of concentrated NH$_4$OH (3.76–4.51 equiv. wt.) which will leave final acidity at pH-5.0 to pH-5.5.
(7) Filter and calcine.

W—UO$_2$

(II) W·UO$_2$ (20 v/o)

(1) Dissolve 156.8 g. AMT with 100 ml. hot H$_2$O to make a 1.395 molal solution.
(2) Dissolve 28.5 g. UNH with 25 ml. hot H$_2$O to make a 2.271 molal solution.
(3) Combine the two solutions and add 10% stoichiometric excess of standard hot oxine solution.
(4) Stir in 750 ml. of room temperature H$_2$O to complete the precipitation.

(J) W·UO$_2$(25 v/o)

(1) Dissolve 169.5 g. AMT with 100 ml. hot H$_2$O to make a 1.508 molal solution.
(2) Dissolve 40.5 g. UNH with sufficient hot H$_2$O to make 25 ml. of 3.227 molar solution.
(3) Combine UNH and AMT solutions.
(4) Stir this clear combined solution into the required 10% excess of hot standard precipitant to form a thin slurry.
(5) Add 750 ml. of room temperature H$_2$O with vigorous stirring.

(K) W·UO$_2$(30 v/o)

(1) Dissolve 138.5 g. AMT with 90 ml. hot H$_2$O to make a 1.369 molal solution.
(2) Dissolve 42.6 g. UNH with 35 ml. hot H$_2$O to make a 2.423 molal solution.
(3) Combine the two solutions and add the usual 10% excess of standard precipitant.
(4) Stir in 750 ml. of room temperature H$_2$O.

(L) W·UO$_2$(32½ v/o)

(1) Dissolve 152.5 g. AMT by heating with 100 ml. hot H$_2$O to make a 1.356 molal solution.
(2) Dissolve 52.6 g. UNH by heating with 25 ml. of hot H$_2$O to make a 4.191 molal solution.
(3) Combine the two solutions and add the usual 10% excess of standard precipitant.
(4) Stir in 750 ml. of room temperature H$_2$O.

(M) W·UO$_2$(45 v/o)

(1) Dissolve 299.9 g. AMT with 176 ml. of hot H$_2$O to make a 1.516 molal solution.
(2) Dissolve 176.0 g. UNH with 107 ml. of hot H$_2$O to make a 3.277 molal solution.
(3) Combine the two solutions and add the usual hot standard precipitant.
(4) Stir in 1770 ml. of hot H$_2$O.

With suitable changes in the amounts of reagents, the above procedure can be used for the simultaneous precipitation of a wide range of tungstyl-uranyl oxinate compositions. However, as the ratio of W:U becomes smaller than that in the above procedure, a composition is reached which requires adjustment of the final pH, in order to obtain a reasonably quantitative precipitation.

The following specific procedure was developed for simultaneous precipitation of tungstyl-uranyl oxinates for calcination and reduction to U-10 w/o W of the 300 g. scale. It illustrates the type of final pH adjustment necessary for satisfactory quantitative precipitations when the ratio of W:U is low.

(N) W·UO$_2$(94.8 v/o)

(1) In a 5-liter flask, add 300 ml. distilled H$_2$O and 569.7 g. UNH. Dissolve by heating nearly to boiling, thus making a 3.782 molal solution.
(3) With UNH solution nearly boiling in flask, add the AMT solution. Shut off heat.
(4) Add the hot standard precipitant.
(5) Add 3000 ml. room temperature H$_2$O with stirring.
(6) Add 240 ml. (3.62 equiv. wt.) concentrated NH$_4$OH to pH-4.1.

This array of W·UO$_2$ compositions involves an unorthodox but necessary precipitation procedure which was discovered by experimentation. Only by combining very concentrated solutions of UNH and AMT, can a clear solution be maintained. The standard precipitant is then added. The resulting slurry is then diluted with sufficient water to negate the complexing effect of the close proximity of these particular ions and allow nearly complete simultaneous quantitative precipitation of the W·U oxinates.

Oxides from the calcination of simultaneously precipitated tungstyl and uranyl oxinates and from the calcination of uranyl polytungstates are given X-ray and optical examinations. Both types of material contain a phase or phases which are not simple oxides of W or U. In some cases a simple oxide, of whichever element is in excess, is reported as an additional phase.

Mo·W·UO$_2$

(O) Mo·W(10 w/o)·UO$_2$(20 v/o)

(1) Dissolve 165.6 g. AHM with sufficient distilled H$_2$O to make 1 liter of 0.134 molar solution.

(2) Transfer to a 5-liter flask and heat to 80° C.
(3) Add 25 ml. (0.37 equiv. wt.) of concentrated $NH_4OH$ to pHH-5.3 at 80° C.
(4) Add 250 ml. of hot 0.377 molar uranyl nitrate solution (47.32 g. UNH/250 ml. $H_2O$).
(5) Add 250 ml. of hot 0.054 molar ammonium metatungstate solution (15.27 g./250 ml. $H_2O$).
(6) Make standard oxinate precipitation.

(P) $Mo \cdot W(20 \text{ w/o}) \cdot UO_2(20 \text{ v/o})$ (1) Dissolve 147.2 g. AHM with sufficient distilled water to make 1 liter of 0.119 molar solution.
(2) Transfer to a 5-liter flask and heat to 80° C.
(3) Add 25 ml. of concentrated $NH_4OH$ (0.37 equiv. wt.) to change from pH-4.6 to pH-5.1 (at 80° C.).
(4) Add 250 ml. of hot 0.358 molar uranyl nitrate solution.
(5) Add 250 ml. of hot 0.108 molar ammonium metatungstate (AMT) solution.
(6) Make standard oxinate precipitation.
Note: Final pH-4 at 70° C. is recorded.

(Q) $Mo \cdot W(30 \text{ w/o}) \cdot UO_2(20 \text{ v/o})$ (1) Dissolve 128.8 g. AHM with sufficient distilled water to make 1 liter of 0.104 molar solution at pH-5.4 (at room temperature).
(2) Heat to 80° C. in a 5-liter flask and add 25 ml. concentrated $NH_4OH$ (0.37 equiv. wt.) to change from pH-4.6 to pH-5.1.
(3) Add 250 ml. of hot 0.341 molar uranyl nitrate solution (42.7 g. UNH/250 ml. solution).
(4) Add 250 ml. of hot 0.163 molar AMT solution (45.8 g. ammonium metatungstate plus sufficient distilled $H_2O$ to make 250 ml. of solution).
(5) Make standard oxinate precipitation.

(R) $Mo \cdot W(40 \text{ w/o}) \cdot UO_2(20 \text{ v/o})$ (1) Dissolve 110.4 g. AHM with sufficient distilled $H_2O$ to make 1 liter of 0.089 molar solution.
(2) Heat to 80° C. in a 5-liter flask and add 25 ml. (0.37 equiv. wt.) concentrated $NH_4OH$.
(3) Add 250 ml. of hot 0.32 molar uranyl nitrate solution (40.4 g. UNH/250 ml. solution).
(4) Add 250 ml. of hot 0.22 molar AMT solution (61.1 g. AMT/250 ml. solution).
(5) Make standard oxinate precipitation.

(S) $Mo \cdot W(50 \text{ w/o}) \cdot UO_2(20 \text{ v/o})$ (1) Dissolve 92.0 g. AHM with sufficient distilled $H_2O$ to make 1 liter of 0.074 molar solution and heat to 80° C. in a 5-liter flask while adding 25 ml. (0.37 equiv. wt.) concentrated $NH_4OH$.
(2) Add 250 ml. of hot 0.30 molar uranyl nitrate solution (37.9 g. UNH/250 ml.).
(3) Add 250 ml. of hot 0.272 molar AMT solution (76.4 g. AMT/250 ml).
(4) Make standard oxinate precipitation.

(T) $Mo \cdot W(60 \text{ w/o}) \cdot UO_2(20 \text{ v/o})$ (1) Dissolve 73.6 g. AHM with sufficient distilled $H_2O$ to make 1 liter of 0.065 molar AHM solution.
(2) Heat to 80° C. in 5-liter flask with 25 ml. (0.37 equiv. wt.) concentrated $NH_4OH$.
(3) Add 250 ml. of hot 0.284 molar uranyl nitrate solution (35.6 g./250 ml.).
(4) Add 250 ml. of hot 0.326 molar AMT solution (91.6 g. AMT/250 ml.).
(5) Make standard oxinate precipitation.

(U) $Mo \cdot W(70 \text{ w/o}) \cdot UO_2(20 \text{ v/o})$ (1) Dissolve 55.2 g. AHM with sfficient distilled $H_2O$ to make a liter of 0.045 molar solution pH-5.4 to pH-5.5.
(2) Heat to 80° C. in a 5-liter flask and add 25 ml. concentrated $NH_4OH$ (0.37 equiv. wt.) to raise the pH back to 5.4–5.5.
(3) Add 250 ml. of hot 0.265 molar uranyl nitrate solution (33.3 g. UNH/250 ml.).
(4) Add 250 ml. of hot 0.346 molar AMT solution (102.5 g. AMT/250 ml.).
(5) Make standard oxinate precipitation.

The above examples could be generalized for making 150 to 170-g. batches of mixed oxides of Mo, W, and U, which could be reduced with $H_2$ to metal-20 v/o $UO_2$ and which have weight ratios of Mo:W of 90:10, 80:20, 70:30, 60:40, 50:50, 40:60, and 30:70. For convenience, the batch sizes are based on a combined weight of 100.0 g. of Mo and W.

(V)

(1) Add the required amount of ammonium heptamolybdate and 1 liter of $H_2O$ to a 5-liter flask and begin heating and stirring.
(2) Add 25 ml. (0.37 equiv. wt.) of concentrated $NH_4OH$ (pH 6.2–6.4) and continue heating to 70–80° C.
(3) Add the required amount of uranyl nitrate dissolved with 250 ml. of hot $H_2O$.
(4) Add the required amount of ammonium metatungstate dissolved with 250 ml. of hot $H_2O$.
(5) While stirring vigorously, add the required amount of oxine dissolved with 0.6 ml. of hot glacial acetic acid per gram.
(6) Filter immediately. (The filtrate should contain less than 0.2 g. of solids unvolatilized at 250° C. in air.)

Modifications of the above procedure are necessary when the mole ratio of Mo:U was less than 3:1. A batch of mixed oxides of Mo, W, and U is made for reduction to 25 v/o $UO_2$ with the Mo:W weight ratio of 20.80. In this case, it is necessary to add 5 ml. of glacial acetic acid and only 20 ml. of concentrated $NH_4OH$ to the Mo salt solution prior to adding the uranyl nitrate solution. For a batch of mixed oxides for reduction to 25 v/o $UO_2$ with the Mo:U weight ratio of 10:90, it is necessary to add 50 ml. of glacial acetic acid and 50 ml. of concentrated $NH_4OH$ prior to adding the uranyl nitrate solution. If the mole ratio of Mo:U is greater than 3:1, any mixture of the three elements should be precipitated as oxinates by the first-mentioned procedure.

(W) $Mo \cdot W(80 \text{ w/o}) \cdot UO_2(25 \text{ v/o})$ (1) Dissolve 36.8 g. AHM with sufficient distilled $H_2O$ to make 1 liter of 0.030 molar solution (pH-5.4).
(2) Heat to 80° C. in a 5-liter flask and add 20 ml. (0.30 equiv. wt.) concentrated $NH_4OH$ to pH-6.2.
(3) Add 5 ml. (0.09 equiv. wt.) concentrated glacial acetic acid to pH-5.3 (at 80° C.). (This reagent acts as an agent inhibiting the unwanted formation of uranyl polymolybdates prior to addition of AMT and precipitant.)
(4) Add 250 ml. of hot 0.327 molar UNH solution (41.1 g./250 ml).
(5) Add 250 ml. of hot 0.417 molar AMT solution (117.1 g./250 ml.).
(6) Make standard precipitation.

(X) $Mo \cdot W(90 \text{ w/o}) \cdot UO_2(25 \text{ v/o})$ (1) Dissolve 18.4 g. AHM with sufficient distilled water to make 1 liter of 0.015 molar solution at pH-5.3.
(2) Add 50 ml. (0.75 equiv. wt.) concentrated $NH_4OH$ to pH-9.3.
(3) Add 50 ml. (0.88 equiv. wt.) concentrated glacial acetic acid to pH-5.2.
(4) Heat to 80° C. (which lowers the pH to 4.8).
(5) Add 250 ml. of 0.304 molar UNH solution (38.1 g. UNH/250 ml.).
(6) Add 250 ml. of 0.469 molar AMT solution (131.8 g. AMT/250 ml.).

Calcination of these molybdenyl-tungstyl-uranyl oxinates is done by the same procedure used for molybdenyl-uranyl oxinates.

Examination of the Mo-W-U mixed oxides by X-ray diffraction showed the presence of an unknown constituent, assumed to be a compound oxide, and a known oxide of the component (either Mo or W) in excess.

Accordingly, the above-described method is capable of preparing finely divided dispersions of $UO_2$ in either or both of Mo and W.

What is claimed is:

1. A method of providing finely divided dispersions of $UO_2$ in a refractory metal matrix comprising mixing an aqueous solution of uranyl nitrate hexahydrate with an aqueous soltuion of at least one of the materials selected from the group consisting of ammonium heptamolybdate and ammonium metatungstate, adding $NH_4OH$ and oxine, separating, drying and calcining he precipitate and then reducing by heating in hydrogen.

2. A method as in claim 1 wherein the oxine is added in the form of a solution formed by adding 0.5 to 0.6 ml. of glacial acetic acid per gram of oxine and heating to between 70 and 80° C. until all the oxine is in solution.

3. A method as in claim 1 wherein reduction is accomplished by heating in hydrogen between about 700 to 760° C. for up to three hours and subsequently raising the temperature to about 1500° C. for up to one hour.

4. A method as in claim 1 wherein the material contains molybdenum and calcination is performed at a temperature of less than 600° C.

5. A method as in claim 1 wherein the material contains tungsten and calcination is performed at about 800° C.

6. A method as in claim 1 wherein the material is ammonium heptamolybdate, the mole ratio of Mo:U is less than 1.5:1 and a strong complexing agent for Mo is added.

7. A method as in claim 6 wherein the strong complexing agent is citric acid.

8. A method as in claim 1 wherein the materials are both amonium heptamolybdate and ammonium metatungstate.

9. A method as in claim 8 wherein the mole ratio of Mo:U is less than 3:1 and glacial acetic acid is added.

References Cited

UNITED STATES PATENTS 3,102,848  9/1963  Sobel _____ 252—301.1

CARL D. QUARFORTH, Primary Examiner

R. L. TATE, Assistant Examiner

U.S. Cl. X.R.

75—206; 176—89